(No Model.)
H. CAMPBELL.
THERMOMETER.
No. 504,298. Patented Aug. 29, 1893.
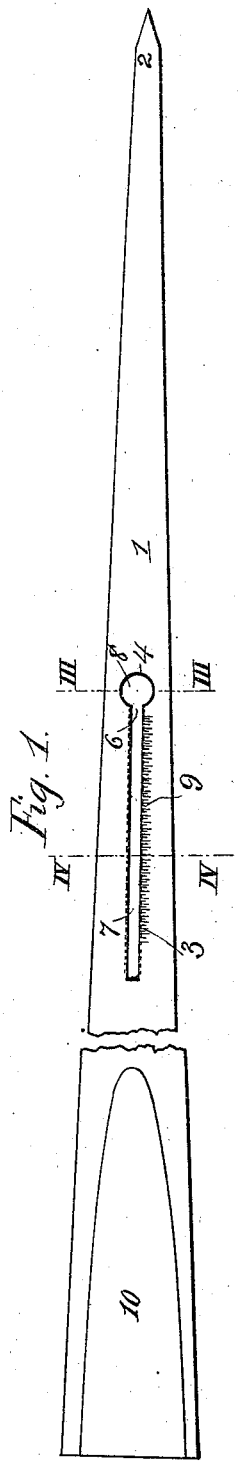
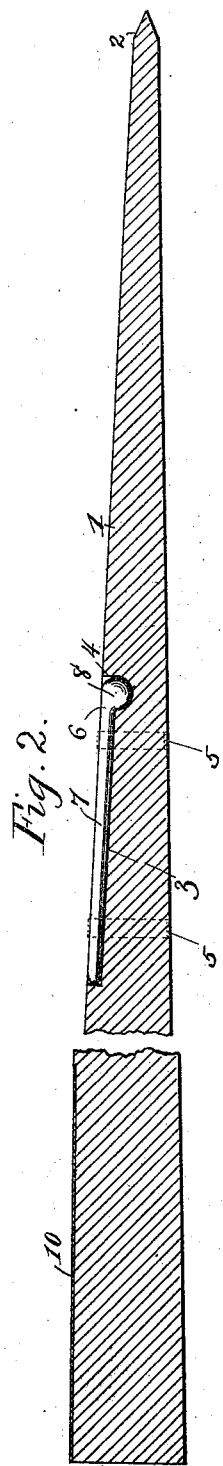
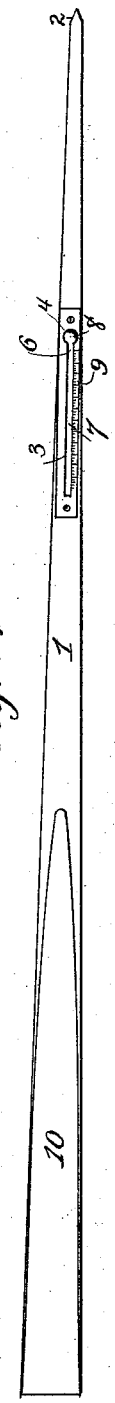
Witnesses
Chas. W. Parker
Thos. P. Borden
Inventor.
Henry Campbell.
by H. N. Low Att'y.

UNITED STATES PATENT OFFICE.

HENRY CAMPBELL, OF BALTIMORE, MARYLAND, ASSIGNOR OF TWO-THIRDS TO JOHN MARR AND JAMES BARKLEY, OF SAME PLACE.

THERMOMETER.

SPECIFICATION forming part of Letters Patent No. 504,298, dated August 29, 1893.

Application filed February 7, 1893. Serial No. 461,383. (No model.)

*To all whom it may concern:*

Be it known that I, HENRY CAMPBELL, a citizen of the United States, residing at Baltimore, in the State of Maryland, have invented certain new and useful Improvements in Hop-Testers; and I do declare the following to be a full, clear, and exact description of the invention, such as will enable others skilled in the art to which it appertains to make and use the same.

In the transportation and storage of hops in bales or otherwise in bulk much difficulty is experienced from the heating of the hops, from fermentation or other cause, which results in their becoming moldy and unfit for use.

It is the object of my invention to provide an instrument by which the labor of opening the bale or other bulk or package of hops for the purpose of drying and airing the interior may be prevented, except when it is necessary by reason of the hops in the middle of the bulk having reached a temperature above which it is unsafe to permit them to heat.

My invention consists in a stick or bar of wood or other suitable substance pointed at one end and adapted to be introduced into the bale or other bulk of hops, and provided with a thermometer.

It further consists in such a stick, bar or rod provided near its point with a recess in which is fitted a thermometer bulb and tube so as not to project above, but preferably to be flush with the surface of the bar or rod.

When this instrument is forced into the bale of hops the thermometer will offer no resistance to its introduction and cannot become broken by the pressure of the hops or by encountering any hard substance in the bale, and yet the thermometer will be in contact with or close to the hops whose temperature is to be tested and will almost immediately rise to their temperature and correctly indicate it when the instrument is withdrawn.

In order to make my invention more clearly understood I have shown in the accompanying drawings means for carrying the same into practical effect without however limiting my improvement in its useful applications to the particular construction which, for the sake of illustration, I have delineated.

In said drawings Figure 1 is a front view of a hop tester embodying my improvements. Fig. 2 is a longitudinal sectional view of the same. Fig. 3 is a transverse sectional view on line III—III of Fig. 1. Fig. 4 is a similar view on the line IV IV of Fig. 1. Fig. 5 is a front view of another form of my invention in which the thermometer is held in place by a slotted covering plate.

Referring to the drawings 1 indicates a stick or bar pointed at 2 so as to be capable of introduction into a bulk of hops when tightly baled and compressed. In this bar is formed a groove 3 of suitable cross section to receive the thermometer tube, which groove terminates in a recess 4 for the thermometer bulb. The groove 3 may be slightly undercut as seen in Fig. 4 so that its edges will somewhat overlap the tube and retain it in the groove; or the thermometer may be held in place by metallic bands 5, indicated in dotted lines in Figs. 1 and 2, which may be let into the rod 1 so as to be flush with its surface.

6 is the thermometer having a tube 7 and bulb 8, the latter being preferably bent backward as indicated in Fig. 2 so that its outer side shall be flush with the outer side of the tube, or at least shall not project beyond it. The rod at the side of the tube 7 is suitably graduated as indicated at 9 in Fig. 1.

The mode of use of this instrument has been hereinbefore sufficiently described. 10 is a flat surface or tablet at or near the outer end or handle of the rod 1. On this tablet is recorded the height of the mercury in the thermometer prior to using the instrument, which record will give the temperature of the air of the room in which the baled or otherwise stored hops are situated. Immediately upon withdrawing the instrument the height of the mercury is again recorded and the difference between the two records will give accurately the amount which the hops at the interior of the bulk are overheated.

Having thus described my invention, what I claim is—

1. In a hop tester the combination of the rod, pointed and provided with a groove as described and the thermometer situated in said groove and substantially flush with the surface thereof, as and for the purposes set forth.

2. In a hop tester the combination with the rod 1 provided with the groove 3 and recess 4, of the thermometer having its tube in said groove and a backwardly bent bulb fitting in said recess, substantially as shown and described and for the purposes set forth.

In testimony whereof I affix my signature in the presence of two witnesses.

HENRY CAMPBELL.

Witnesses:
H. N. LOW,
J. S. BARKER.